(12) United States Patent
Schlesinger

(10) Patent No.: US 6,980,374 B1
(45) Date of Patent: Dec. 27, 2005

(54) SOLID IMMERSION MIRROR

(75) Inventor: Tuviah Ehud Schlesinger, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 26 days.

(21) Appl. No.: 10/988,144

(22) Filed: Nov. 12, 2004

(51) Int. Cl.[7] .......... G02B 13/20; G02B 17/00; G11B 7/00
(52) U.S. Cl. .......... 359/726; 359/727; 359/707; 369/112.23
(58) Field of Search .......... 359/726, 727, 359/707, 708, 730, 731; 369/112.23, 112.29, 369/44.23

(56) References Cited

U.S. PATENT DOCUMENTS

| | | | |
|---|---|---|---|
| 6,185,051 B1 | 2/2001 | Chen et al. | 359/709 |
| 6,594,430 B1 | 7/2003 | Rausch et al. | 385/129 |
| 6,707,026 B2 | 3/2004 | Hatano et al. | 250/216 |
| 2003/0035361 A1 | 2/2003 | Knight | 369/112.24 |
| 2003/0128633 A1 | 7/2003 | Batra et al. | 368/13.32 |
| 2003/0128634 A1 | 7/2003 | Challener | 369/13.33 |
| 2003/0137772 A1 | 7/2003 | Challener | 360/131 |
| 2003/0184903 A1 | 10/2003 | Challener | 360/59 |
| 2004/0001394 A1 | 1/2004 | Challener et al. | 369/13.32 |
| 2004/0001420 A1 | 1/2004 | Challener | 369/112.27 |
| 2004/0008591 A1 | 1/2004 | Johns et al. | 369/13.14 |
| 2004/0062503 A1 | 4/2004 | Challener | 385/129 |

*Primary Examiner*—Timothy Thompson
(74) *Attorney, Agent, or Firm*—Robert P. Lenart, Esq.; Pietragallo, Bosick & Gordon

(57) ABSTRACT

An apparatus for focusing electromagnetic radiation comprises a planar solid immersion mirror including edges for reflecting an electromagnetic wave toward a focal point adjacent to a truncated end of the planar solid immersion mirror, and an interface for diverting a portion of the electromagnetic wave from a central portion of the planar solid immersion mirror to the edges for subsequent reflection toward the focal point.

15 Claims, 3 Drawing Sheets

US 6,980,374 B1

SOLID IMMERSION MIRROR

STATEMENT REGARDING FEDERALLY SPONSORED RESEARCH OR DEVELOPMENT

This invention was made with United States Government support under Agreement No. 70NANB1H3056 awarded by the National Institute of Standards and Technology (NIST). The United States Government has certain rights in the invention.

FIELD OF THE INVENTION

This invention relates to optical transducers that are used to focus an electromagnetic wave to a focal point, and more particularly, to such transducers that can be used in optical and/or magneto-optical storage devices.

BACKGROUND OF THE INVENTION

Heat assisted magnetic recording (HAMR) has been proposed as a means by which the recording density of magnetic hard disc drives may be extended to 1 Tb/in$^2$ or higher. Current conventional hard disc drive technology is limited by the superparamagnetic effect, which causes the small magnetic grains needed for high density recording media to gradually lose their magnetization state over time due to thermal fluctuations. By using heat assisted magnetic recording, the magnetic anisotropy of the recording medium, i.e. its resistance to thermal demagnetization, can be greatly increased while still allowing the data to be recorded with standard recording fields. A laser beam heats the area on the disc that is to be recorded and temporarily reduces the anisotropy (and hence coercivity) in just that area sufficiently so that the applied recording field is able to set the magnetic state of that area. After cooling back to the ambient temperature, the anisotropy returns to its high value and stabilizes the magnetic state of the recorded mark.

HAMR requires an apparatus that is able to conduct sufficient light energy into the recording medium to heat it by several hundred degrees, but only in the area that is desired to be recorded, which typically will have dimensions on the order of 25 to 50 nm if the recording density is 1 Tb/in$^2$. If the optical hot spot is larger than this area, it will extend to neighboring bits and tracks on the disc, and by heating those areas as well, will cause the data recorded in those areas to be erased eventually. Confining the optical spot to an area that is much smaller than a wavelength of light, and well below the so-called "diffraction limit" that can be achieved by standard focusing lenses, is an area of study called "near field optics" or "near field microscopy."

Solid immersion mirrors have been proposed for use in optical transducers in HAMR recording systems. In some applications envisioned for the use of a solid immersion mirror, a device (such as a metal pin) can be placed at the focus of the mirror, which is often in the shape of a parabola, in order to achieve an additional function, for example, such as producing an optical spot well below the diffraction limit of the mirror. However, in order to be used in this manner, the solid immersion mirror would have to be terminated. Light entering a terminated solid immersion mirror near the central axis is not reflected toward the focal point. The lost rays in the central portion can be significant since it is likely that the intensity profile of the electromagnetic wave across the solid immersion mirror will not be uniform but rather Gaussian (or similar) so that the most intense light (near the central axis) would be lost due to the termination of the solid immersion mirror.

This invention provides a transducer design that provides improved transfer of optical energy to a focal point.

SUMMARY OF THE INVENTION

This invention provides an apparatus comprising a planar solid immersion mirror including edges for reflecting an electromagnetic wave toward a focal point adjacent to a truncated end of the planar solid immersion mirror, and an interface for diverting a portion of the electromagnetic wave from a central portion of the planar solid immersion mirror to the edges for subsequent reflection toward the focal point.

DETAILED DESCRIPTION OF THE INVENTION

Figure 1:
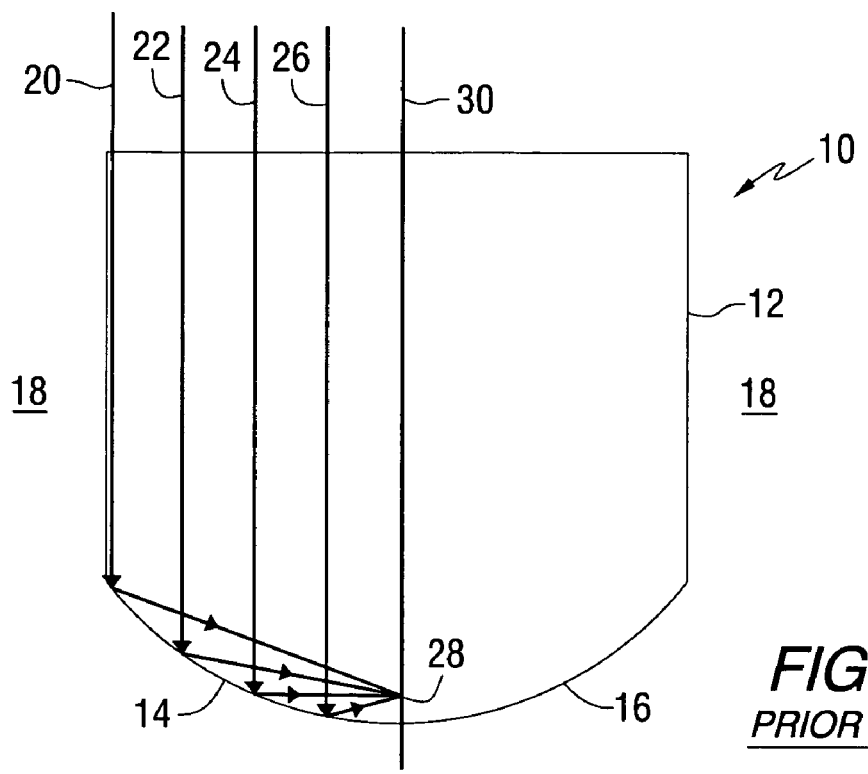
FIG. 1 is a schematic drawing of a solid immersion mirror.

Two-dimensional planar waveguides can be used to produce focused beams of electromagnetic radiation by means of mode index lenses or planar solid immersion mirrors. The electromagnetic radiation can be, for example, ultraviolet, infrared, or visible light, but is generally referred to as light, optical rays, or a beam, in this description. Referring to the drawings, FIG. 1 is a plan view of a previously known solid immersion mirror (SIM) 10. The SIM includes a dielectric optical guiding layer 12 in a planar waveguide configuration. The guiding layer includes edges 14, 16 formed into a parabolic shape with an effective index step at the edges. The effective index step is created between the guiding layer 12 and the surrounding material 18 so that optical rays such as those identified as arrows 20, 22, 24 and 26 are directed to a focal point 28 of the guiding layer. The focal point is positioned on a central longitudinal axis 30. The effective index step can be achieved by any one of a number of well-established methods including the use of a layer thickness change or a material change.

With a sufficiently high effective index change at the parabolic edges, light incident onto the parabola undergoes total internal reflection and is directed to the focus of the parabola. In FIG. 1, rays indicated by arrows 20, 22 and 24 undergo reflection and are directed back to the focus.

In some applications envisioned for the use of a solid immersion mirror, a device such as a metallic pin may be placed at the focus of the parabola in order to achieve an additional function, such as for example, producing an optical spot well below the diffraction limit of the mirror. However, in order to be used in this manner, the solid immersion mirror would have to be terminated as shown in FIG. 2.

Figure 2:
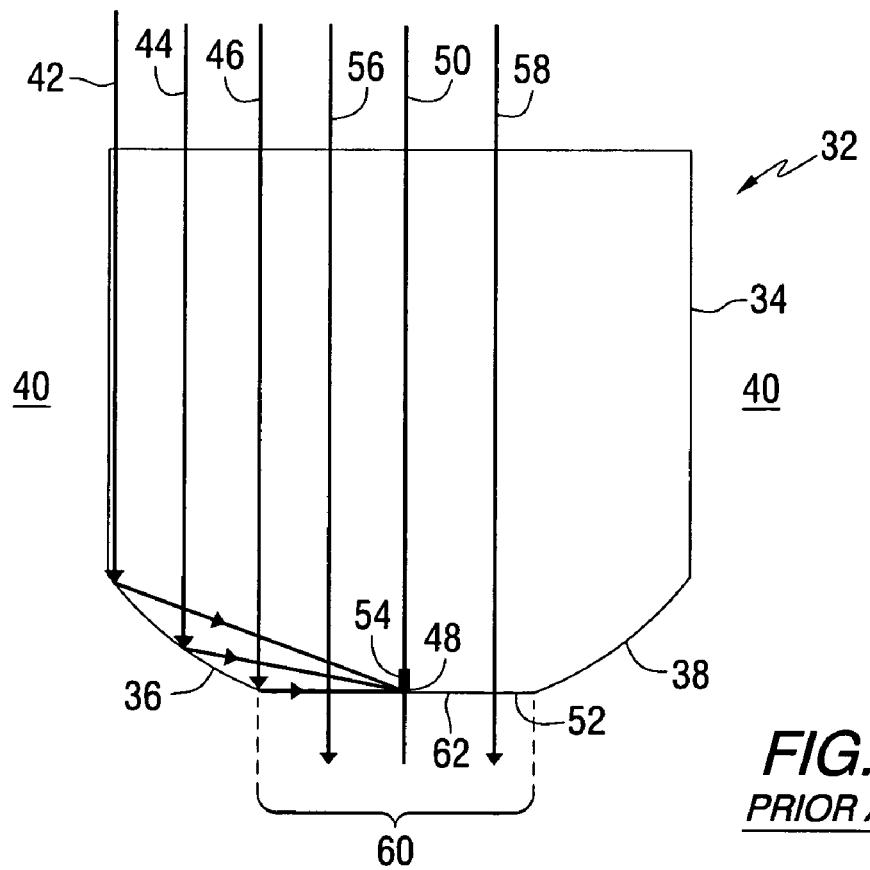
FIG. 2 is a schematic drawing of a truncated solid immersion mirror.

FIG. 2 is a plan view of a previously known terminated solid immersion mirror 32. The SIM of FIG. 2 includes a dielectric optical guiding layer 34 in a planar waveguide configuration. The guiding layer includes edges 36 and 38 formed in a parabolic shape with an effective index step at the edges. An effective index step can be created between the guiding layer 34 and the surrounding material 40 so that optical rays such as those identified as items 42, 44 and 46 are directed to a focal point 48 of the parabolic interface. The focal point is positioned on a central longitudinal axis 50.

With a sufficiently high effective index change at the parabolic edges, light incident onto the edges undergoes total internal reflection and is directed to the focus of the parabola. A truncated end, or termination, 52 is employed to allow for the placement of an additional optical device, such as a metal pin 54, to which the mirror delivers the optical field. In the SIM of FIG. 2, rays 56 and 58 in a central portion 60 of the waveguide are not delivered to the focal point of the mirror. The central portion is symmetrical about the central, or longitudinal, axis 50, and has a width equal to the length of the straight portion of the truncated end 52.

Figure 3:
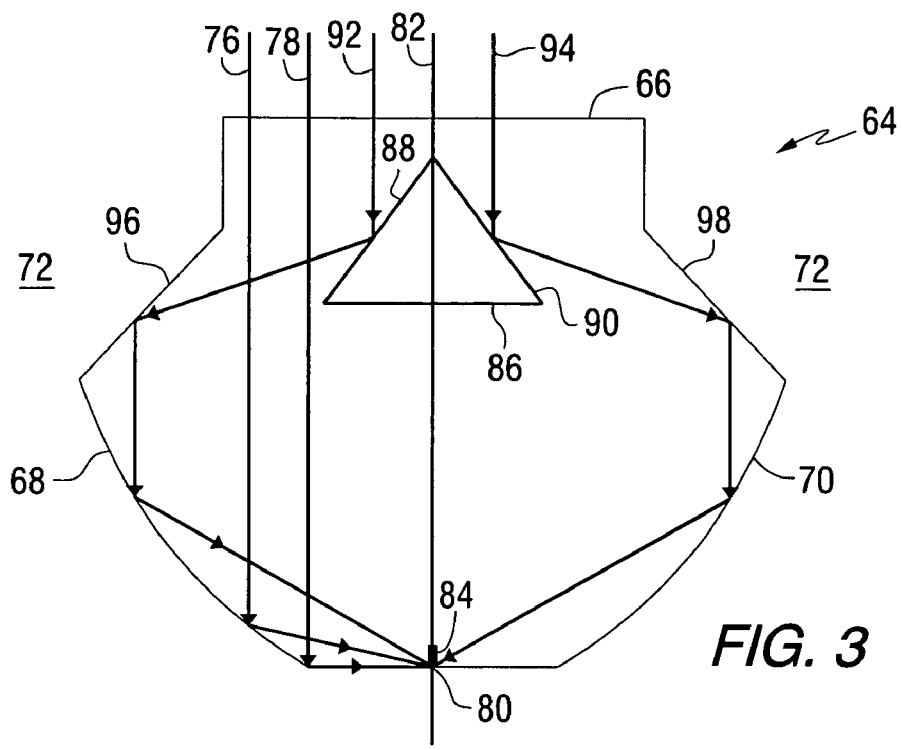
FIG. 3 is a schematic drawing of a solid immersion mirror constructed in accordance with this invention.

FIG. 3 is a plan view of a solid immersion mirror 64 constructed in accordance with this invention. The SIM of FIG. 3 includes a dielectric optical guiding layer 66 in a planar waveguide configuration. The guiding layer is formed into a parabolic shape with an effective index step at the edges 68, 70 of the parabola. An effective index step is created at an interface between the guiding layer 66 and the surrounding material 72 so that optical rays, such as those identified as items 74, 76 and 78, are directed to a focal point 80 positioned on the central longitudinal axis 82. A transducer, such as a metal pin 84, can be positioned at the focal point.

As used in this description, an effective step index is a change in the optical index of refraction experienced by a particular optical mode of the waveguide. It is a "step" if the change is abrupt due to an abrupt change in material or material thickness. It is referred to as an "effective" index since the optical mode experiences an index of refraction that is some combination of the indices of refraction of all the materials into which the mode extends and this may be different than the index of refraction of one material alone. The change in index need not necessarily be abrupt, but may also be changed gradually if the material composition or thickness is varied continuously. The effective step index can be created by a difference in the refractive index of the material of the planar waveguide and the material adjacent to the planar waveguide. The effective step index could alternatively be created by a change in the thickness of the guiding layer.

An additional step change in the refractive index is created, in the example of FIG. 3, by a structure 86 embedded in, or positioned adjacent to, the guiding layer. The interfaces 88, 90 of structure 86, in combination with the guiding layer, cause light rays that would otherwise not be directed to the focal point of the parabola (such as rays 92 and 94) to undergo additional reflections at edges 96 and 98, and therefore be directed to the focus of the parabola. In the example of FIG. 3, the additional edges of the solid immersion mirror are straight. However, other shapes can be used for the edges.

Interfaces 88 and 90 can be created by embedding a structure 86 in the guiding layer, where the structure 86 has a refractive index that differs from that of the guiding layer. The effective index of the structure 86 would be lower than the guiding layer effective index. Thus structure 86 could be formed at the same time, and with the same process, as that used to fabricate the parabolic edge of the SIM. This invention does not require the addition of any additional processing steps.

Figure 4:
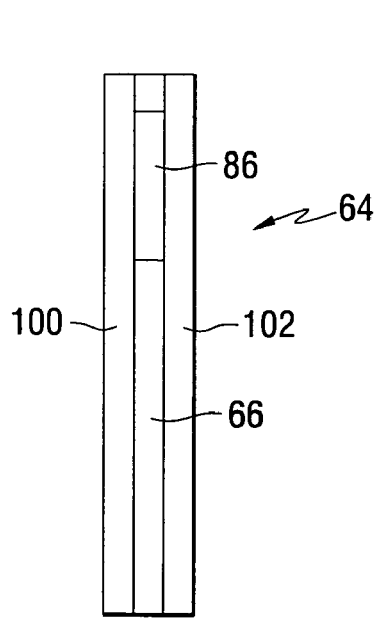
FIG. 4 is a schematic side view of a solid immersion mirror constructed in accordance with this invention.

FIG. 4 is a schematic side view of a solid immersion mirror 64 of FIG. 3. The guiding layer 66 is shown to be positioned between two cladding layers 100 and 102. In this example, the structure 86 is embedded in the guiding layer.

Figure 5:
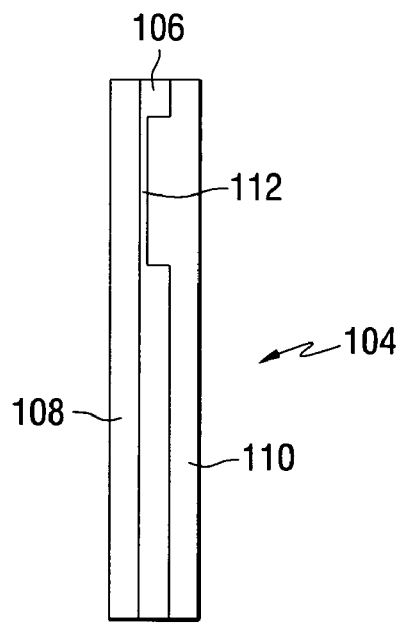
FIG. 5 is a schematic side view of another solid immersion mirror constructed in accordance with this invention.

FIG. 5 is a schematic side view of another solid immersion mirror 104 constructed in accordance with this invention. The solid immersion mirror 104 includes a guiding layer 106 and is shown to be positioned between two cladding layers 108 and 110. In this example, the guiding layer includes a section 112 having a thickness that is less than the thickness of the remainder of the guiding layer. This section of decreased thickness forms an interface which provides the step changes in index that divert rays in the central portion of the guiding layer to the edges for subsequent reflection to the focal point. Section 112 should generally have a smaller thickness than the guiding layer since the guiding layer should be the highest index material and section 112 should have a lower index. However in some cases, section 112 could be thicker. Section 112 may be made thicker if it was desired to form structures where the index was higher than the surrounding material. Rather than reflecting the rays, the rays could be refracted towards opposite sides of the SIM and then redirected by the SIM to the focus.

Just as the SIM itself need not be limited to a parabolic shape but may include any shape that advantageously modifies the phase front of the incident optical field, structure 86 need not be limited to straight edges. The shape and size of the additional interfaces is open to optimization based on the application for which this device would be used. Thus the interfaces 88 and 90 in FIG. 3 need not be straight and the interaction between the various surfaces, such as the relative phase of the wavefronts that arrive at the focus after reflection may be optimized as needed for particular applications.

Figure 6:
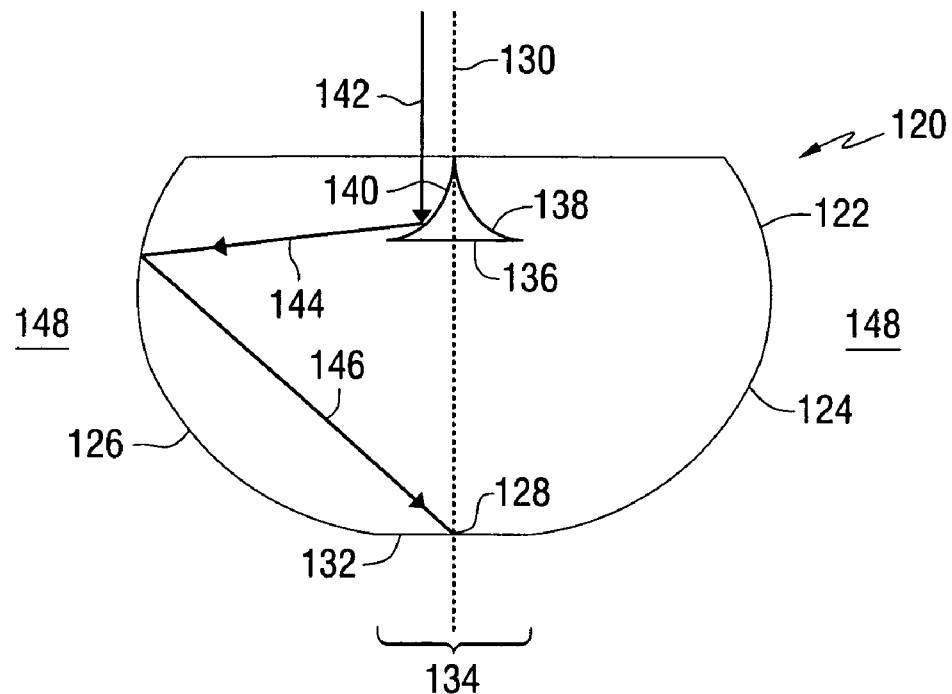
FIGS. 6 and 7 are schematic representations of other solid immersion mirrors constructed in accordance with the invention.

FIG. 6 is a schematic representation of another solid immersion mirror 120 constructed in accordance with the invention. The solid immersion mirror 120 includes a guiding layer 122 having edges 124 and 126 shaped to reflect light toward a focus 128 positioned on a central axis 130 and adjacent to a truncated end 132. A central portion 134 of the guiding layer has a width that substantially corresponds to the length of the truncated end. A structure 136 is provided in the central portion to create interfaces 138 and 140, which provide an effective step index between the guiding layer 122 and the structure 136. Light, as illustrated by arrows 142, 144 and 146 is reflected by the interfaces and directed toward the edges of the guiding layer. Additional effective step indexes are created between the surrounding material 148 and the guiding layer so that optical rays are reflected off of the edges and directed to the focus 128 of the guiding layer.

In FIG. 6, the shape of interfaces 138 and 140 can be something other than straight so that rays are directed as desired to the focus. In addition, the shape of edges 124 and 126 can be something other than parabolic so that rays are directed as desired to the focus.

Figure 7:
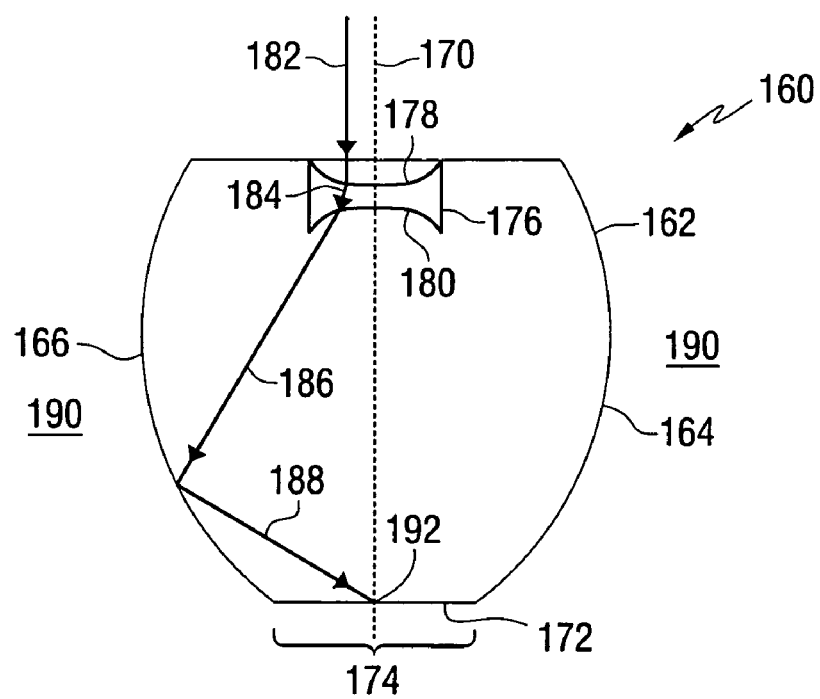

FIG. 7 is a schematic representation of another solid immersion mirror 160 constructed in accordance with the invention. The solid immersion mirror 160 includes a guiding layer 162 having edges 164 and 166 shaped to reflect light toward a focus 192 positioned on a central axis 170 and adjacent to a truncated end 172. A central portion 174 of the guiding layer has a width that substantially corresponds to the length of the truncated end. A structure 176 is provided in the central portion to create interfaces 178 and 180, which provide an effective step index between the guiding layer 162 and the structure 176. Light, as illustrated by arrows 182, 184, 186 and 188, is refracted by the interfaces and directed toward the edges of the guiding layer. Additional effective step indexes are created between the surrounding material 190 and the guiding layer so that optical rays are reflected off of the edges and directed to a focal point 192 of the guiding layer.

In the solid immersion mirror of FIG. 7 structure 176 is a refractive element rather than reflective element, as in the solid immersion mirror of FIG. 6. In FIG. 7, the shape of interfaces 178 and 180 can be something other than straight so that rays are directed as desired to the focus. In addition, the shape of edges 164 and 166 can be something other than parabolic so that rays are directed as desired to the focus.

FIGS. 6 and 7 indicate that the interfaces need not all be straight or limited to particular curves such as a parabola. The reflective or refractive structure may have curved edges that help focus or adjust the phase of the optical field in whatever manner may be desired.

The examples shown in FIGS. 3–7 include a two-dimensional planar waveguide. The angle at which total internal reflection will take place and the shape of the optimal interfaces to be used to achieve additional functions can be substantially different than what might be used in three-dimensional optical systems. These additional functions may include focusing or defocusing the incident beam in order to create a desired intensity distribution since the incident light is not likely to be a uniform plane wave in most applications. In addition phase retardations may be introduced as may be desired by changing the relative position of interface 88 and 90 with respect to each other or the other interfaces of the SIM. Three-dimensional optical systems obey the well-known Fresnel equations (which describe the magnitude of transmitted and reflected waves for waves incident on a dielectric interface and which also depend on the polarization of the light). However the two-dimensional (planar) waveguide devices of this invention are governed by what are essentially mode matching equations and the magnitude of the transmitted, reflected, or leakage modes are not governed by the same three-dimensional Fresnel equations. Thus the two-dimensional devices of this invention are not simple two-dimensional versions of three-dimensional devices.

In addition, in two dimensions the shape of the interfaces can be defined lithographically and thus shapes that would be very difficult to fabricate as three-dimensional surfaces (and hence might not even be considered) can be fabricated with no more difficulty in two dimensions than "regular" surfaces such as a parabola or straight line.

The solid immersion mirrors of this invention can be fabricated using processes similar to those used to fabricate the solid immersion mirrors of FIGS. 1 and 2. The improvement is in the form of one or more additional effective step indexes formed in the solid immersion mirror that cause rays near the central axis of the guiding layer to undergo additional reflections (or refractions) so as to be directed to the focus of the mirror even though the mirror is terminated to accommodate an additional optical device.

For heat assisted magnetic recording, an electromagnetic wave of, for example, visible or ultraviolet light is directed onto a surface of a data storage medium to raise the temperature of the localized area of the medium to facilitate switching of the magnetization of the area. A metal pin can be inserted at the focus of a SIM to guide a confined beam of light out of the SIM to the surface of the recording medium.

If the electric field at the focal point is parallel to the axis of the pin, then it can couple to the pin and generate surface plasmons along the surface of the pin. Near field radiation then emanates from the tip of the pin. The metal pin placed at the focus concentrates the light to a much smaller spot than would be possible with a mode index lens or SIM alone. The waveguide can be truncated at the end adjacent to the pin so that most of the incoming electromagnetic wave strikes the edges of the waveguide at an angle less than some predetermined angle, such as 450. For a linearly polarized collimated electromagnetic wave, edges having a parabolic shape will focus the wave to a focal point. However, it should be understood that other edge shapes could be used if the incoming wave is conditioned such that the combination of the wave characteristics and the edge shape result in the desired focusing of the wave at the pin.

The interfaces can be shaped such that at the focal point, the wave on one side of the axis is phase shifted with respect to the wave on the other side of the axis. If the phase shift is 180°, then the electric field of the wave will have a longitudinal component that is parallel to the axis of the guiding layer. The solid immersion mirrors of this invention can be made of a core waveguide of, for example, $Ta_2O_5$, $SiN_x$, or GaP, with a cladding outside of the core. The cladding layer must have a lower refractive index than the core layer. Preferably the difference in refractive index between the core and cladding should be as large as possible. Air is a suitable dielectric for one side of the cladding. Other dielectrics could be, for example, $SiO_2$ or, $Al_2O_3$. Alternatively, the region outside the core waveguide could be another waveguide with a lower mode index or, a dielectric material with refractive index less than the mode index. The mirror could also be constructed by having a metal such as gold, silver, aluminum, or platinum, outside the core.

Means can be provided to phase shift a portion of the electromagnetic wave for those applications that might require such a phase shift. Rays on one side of the central axis can be phase shifted by 180° with respect to the rays on the other side of the central axis, for example. This phase shift can be achieved by providing a means for launching the two-dimensional analog of a radially polarized wave into the planar waveguide. For example, offset grating couplers could be used on opposite sides of the central axis of the SIM. When the reflected waves meet at the focal point, the transverse components of the electric fields cancel and the longitudinal components of the electric fields add. This excites surface plasmons on the metal pin.

This invention can also be used in optical recording applications in which either a magnetic field is not needed, such as write once and phase change recording, or where an external magnet could be positioned below the substrate, such as in magneto-optic recording. The transducers of this invention can also be used on HAMR recording devices or in other devices that require a small spot of light or other electromagnetic radiation, for example, in optical lithography, near field microscopy, or in biological micro-sensors.

The truncated parabolic SIM design can be easily mounted at its top edge without interfering with the incident high angle rays. The guiding layer should be essentially achromatic because the light rays are reflected rather than refracted and the angle of reflection is independent of wavelength or refractive index. Another advantage of this design is that often the incident collimated beam has a Gaussian intensity profile. In a parabolic SIM design, the highest angle rays reflected to the focal point come from nearer to the center of the incident beam and, therefore, will have a higher intensity.

While this invention has been described in terms of several examples, it will be apparent to those skilled in the art that various changes can be made to the disclosed examples without departing from the scope of the invention as set forth in the following claims.

What is claimed is:

1. An apparatus comprising:
   a planar solid immersion mirror including a first edge for reflecting an electromagnetic wave toward a focal point adjacent to a truncated end of the planar solid immersion mirror; and
   a first interface for diverting a portion of the electromagnetic wave from a central portion of the planar solid immersion mirror to the first edge for subsequent reflection toward the focal point.

2. The apparatus of claim 1, wherein the planar solid immersion mirror includes a planar waveguide and the first interface comprises:
   a first section of the planar waveguide having an index of refraction that differs from an index of refraction of a second section of the planar waveguide.

3. The apparatus of claim 1, wherein the planar solid immersion mirror includes a planar waveguide and first interface comprises:
   a first section of the planar waveguide having a thickness that differs from a thickness of a second section of the planar waveguide.

4. The apparatus of claim 1, wherein a first portion of the first edge has a substantially parabolic shape and a second portion of the first edge is substantially straight.

5. The apparatus of claim 1, further comprising a metal pin positioned adjacent to the focal point.

6. The apparatus of claim 1, wherein the first interface for diverting a portion of the electromagnetic wave from a central portion of the planar solid immersion mirror to the first edge for subsequent reflection toward the focal point is formed by a reflective element.

7. The apparatus of claim 1, wherein the first interface for diverting a portion of the electromagnetic wave from a central portion of the planar solid immersion mirror to the first edge for subsequent reflection toward the focal point is formed by a refractive element.

8. The apparatus of claim 1, wherein the planar solid immersion mirror includes a second edge for reflecting the electromagnetic wave toward the focal point, and the apparatus further comprises:
   a second interface for diverting a portion of the electromagnetic wave from the central portion of the planar solid immersion mirror to the second edge for subsequent reflection toward the focal point.

9. The apparatus of claim 8, wherein the planar solid immersion mirror includes a planar waveguide and each of the first and second interfaces comprises a first section of the planar waveguide having an index of refraction that differs from an index of refraction of a second section of the planar waveguide.

10. The apparatus of claim 8, wherein the planar solid immersion mirror includes a planar waveguide and each of the first and second interfaces comprises a first section of the planar waveguide having a thickness that differs from a thickness of a second section of the planar waveguide.

11. The apparatus of claim 8, wherein a first portion of each of the edges has a substantially parabolic shape and a second portion of each of the edges is substantially straight.

12. The apparatus of claim 8, further comprising a metal pin positioned adjacent to the focal point.

13. The apparatus of claim 8, wherein the electromagnetic wave is linearly polarized and the apparatus further comprises means for phase shifting a first portion of the electromagnetic wave by 180° with respect to a second portion of the electromagnetic wave.

14. The apparatus of claim 8, wherein the first and second interfaces are formed by a reflective element.

15. The apparatus of claim 8, wherein the first and second interfaces are formed by a refractive element.

* * * * *

UNITED STATES PATENT AND TRADEMARK OFFICE
CERTIFICATE OF CORRECTION

PATENT NO.      : 6,980,374 B1                                                      Page 1 of 1
DATED           : December 27, 2005
INVENTOR(S)     : Tuviah Ehud Schlesinger It is certified that error appears in the above-identified patent and that said Letters Patent is hereby corrected as shown below:

<u>Title page,</u>
Item [56], References Cited, U.S. PATENT DOCUMENTS,
after "2003/0035361 A1  2/2003  Knight", insert -- et al --.

<u>Column 6,</u>
Line 5, "450" should read -- 45° --.

Signed and Sealed this

Fourth Day of April, 2006

JON W. DUDAS
*Director of the United States Patent and Trademark Office*